United States Patent [19]

Richardson

[11] Patent Number: 5,178,736
[45] Date of Patent: Jan. 12, 1993

US005178736A

[54] LIGHT COLORED CONDUCTIVE ELECTROCOAT PAINT

[75] Inventor: Eugene Richardson, Pennsauken, N.J.

[73] Assignee: E. I. Du Pont de Nemours and Company, Wilmington, Del.

[21] Appl. No.: 733,202

[22] Filed: Jul. 19, 1991

Related U.S. Application Data

[62] Division of Ser. No. 520,284, May 7, 1990.

[51] Int. Cl.$^5$ .............................................. C25D 13/10
[52] U.S. Cl. ................................ 204/181.1; 204/181.7
[58] Field of Search ............... 204/181.1, 181.4, 181.7; 252/518

[56] References Cited

U.S. PATENT DOCUMENTS

| | | | |
|---|---|---|---|
| 4,775,412 | 10/1988 | Nishikura et al. | 252/518 |
| 4,988,420 | 1/1991 | Batzill et al. | 204/181.1 |
| 5,028,481 | 7/1991 | Stramel | 428/461 |
| 5,068,063 | 11/1991 | Tremper | 252/518 |

*Primary Examiner*—John Niebling
*Assistant Examiner*—Kishor Mayrkar
*Attorney, Agent, or Firm*—Hilmar L. Fricke

[57] ABSTRACT

Disclosed herein are cathodic electrocoat compositions which contain electroconductive pigments. These pigments are light in color, and can be added at higher pigment to binder ratios for improved edge coverage. More specifically, the electroconductive pigments are a two-dimensional network of antimony-containing tin oxide crystallites which exist in a unique association with amorphous silica or with a silica-containing material.

7 Claims, No Drawings

LIGHT COLORED CONDUCTIVE ELECTROCOAT PAINT

This is a division of application Ser. No. 07/520,284, filed May 7, 1990.

TECHNICAL FIELD

The field of art to which this invention pertains is cathodic electrodepositable coatings which contain light colored conductive pigments. The conductive pigments of our invention do not contain carbon black. The pigments are a two-dimensional network of antimony-containing tin oxide crystallites which exist in a unique association with amorphous silica or with a silica-containing material.

BACKGROUND ART

The coating of electrically conductive substrates by electrodeposition is a well known and important industrial process. (For instance, electrodeposition is widely used in the automotive industry to apply primers to automotive substrates). In this process, a conductive article is immersed as one electrode in a coating composition made from an aqueous emulsion of film-forming polymer. An electric current is passed between the article and a counter-electrode in electrical contact with the aqueous emulsion, until a desired coating is produced on the article. The article to be coated is the cathode in the electrical circuit with the counter-electrode being the anode.

Resin compositions used in cathodic electrodeposition baths are also well known in the art. These resins are typically manufactured from polyepoxide resins which have been chain extended and adducted to include a nitrogen. The nitrogen is typically introduced through reaction with an amine compound. Typically these resins are blended with a crosslinking agent and then salted with an acid to form a water emulsion which is usually referred to as a principal emulsion.

The principal emulsion is combined with a pigment paste, coalescent solvents, water, and other additives at the coating site to form the electrodeposition bath. The electrodeposition bath is placed in an insulated tank containing the anode. The article to be coated is made the cathode and is passed through the tank containing the electrodeposition bath. The thickness of the coating is a function of the bath characteristics, the electrical operating characteristics, the immersion time, and so forth.

The coated object is removed from the bath after a set amount of time. The object is rinsed with deionized water and the coating is cured typically in an oven at sufficient temperature to produce crosslinking.

The prior art of cathodic electrodepositable resin compositions, coating baths, and cathodic electrodeposition processes are disclosed in U.S. Pat. Nos. 3,922,253; 4,419,467; 4,137,140; and 4,468,307 which are incorporated herein by reference.

Cathodic electrodeposition is widely used in the automotive industry because it gives superior corrosion protection, it covers recessed or hard to reach areas, it deposits a uniform film thickness free of voids and defects such as sags or runs, it is not labor intensive, it has less emissions to the environment and there is less exposure to workers.

Typical commercial cathodic electrocoat films are not conductive after cure. However, having a conductive electrocoated film can be advantageous for a number of reasons. For instance, a conductive film allows re-electrocoating over the initial electrocoat layer. Re-electrocoating can be beneficial since current commercial cathodic electrocoat systems have certain practical limits to the amount of film build obtainable, and during the cure there is a tendency for the film to pull away from sharp edges thereby reducing edge corrosion protection. One way of increasing the film build and improving edge coverage is by re-electrocoating over the initial cured film. But in order to re-electrocoat it is necessary that the initial coat have sufficient conductivity to allow the re-electrocoat process to occur. (Re-electrocoating over a non-cured non-conductive electrocoat film is possible but it is not a preferred method. This "wet-on-wet" re-electrocoating does not solve the edge coverage problem.)

A conductive film might also be beneficial since it could improve transfer efficiency of electrostatic spraying over the electrocoated film. This is an advantage because less paint is used to get the same coverage and it would also minimize air pollution.

Applying conductive electrocoated films has been done in the past by using conductive powders in the electrocoat composition. Conductive powders currently used to make the electrocoat layer conductive are carbon black, graphite or noble metal powders. The noble metal powders are not usable in cathodic electrocoat because their density would cause them to settle in the bath and on horizontal surfaces of the object being electrocoated. Carbon black and graphite have the limitation that they are black in color and therefore can only be used in black or very dark colors. This is a disadvantage because the dark color requires the use of a thicker layer of topcoat to cover the darker color of the electrocoat primer.

A further disadvantage of using carbon black or graphite powders is that they can only be used at relatively low pigment concentrations (5/100 or less pigment to binder ratio) because at higher concentrations film appearance becomes unacceptable (e.g. orange peel). The problem with the low pigment concentrations necessary when using carbon blacks is that they result in poor edge coverage because of excessive flow out from sharp edges during baking.

What is needed is a cathodic electrocoat composition which forms a conductive film which is light in color and allows higher pigment to binder ratios to improve edge coverage.

SUMMARY OF THE INVENTION

It has been discovered that certain non-carbon black pigments are electroconductive, are light in color, and can be added at higher pigment to binder ratios for improved edge coverage. More specifically, the electroconductive pigments are a two-dimensional network of antimony-containing tin oxide crystallites which exist in a unique association with amorphous silica or with a silica-containing material. These electroconductive pigments allow a wide color range of electrically conductive electrocoat primers (i.e. pastels, saturated colors and whites) which was not possible with the conventional conductive pigments of the prior art.

DETAILED DESCRIPTION OF THE INVENTION

As previously mentioned, it is well known that most principal emulsions in electrodeposition baths comprise an epoxy amine adduct blended with a cross-linking agent and salted with an acid in order to get a water soluble product. The electroconduitve pigments of our invention are potentially usable with a variety of different cathodic electrocoat binder resins, but the preferred binder resin is the typical epoxy-amine adduct of the prior art. The preferred resins are primary hydroxy containing resins well known in the art. They are generally disclosed in U.S. Pat. Nos. 4,397,990 and 4,419,467 which are incorporated herein by reference.

Likewise the preferred crosslinkers for the above mentioned binder resins are also well known in the prior art (the electroconductive pigments disclosed herein are potentially usable with a variety of different crosslinkers). They are aliphatic and aromatic isocyanates such as hexamethylene diisocyanate, toluene diisocyanate, methylene diphenyl diisocyanate and so forth. These isocyanates are pre-reacted with a blocking agent such as oximes, alcohols, and caprolactams which block the isocyanate functionality (i.e. the crosslinking functionality). Upon heating the blocking agents separate and crosslinking occurs. Isocyanate crosslinkers and various blocking agents are well known in the prior art. These crosslinking agents and blocking agents are also disclosed in U.S. Pat. No. 4,419,467.

Curing catalysts such as tin catalysts are usually present in the composition and are also well known in the prior art. Examples are dibutyltin oxide (DBTO) and dibutyltin dilaurate. When used, they are typically present in amounts of about 0.05 to 1 percent by weight based on weight of total resin solids.

The cationic resin and the blocked isocyanate crosslinker are the principal resinous ingredients in the electrocoating composition and are usually present in amounts of about 30 to 50 percent by weight of solids.

The electroconductive pigment of the invention results in a cured electrocoat film that is electrically conductive but does not have a dark color since carbon black pigment is not used to make the composition conductive. It is possible to have a composition that is colorless, the same color as the topcoat, or a light color that is easily hidden by the topcoat at a conventional film thickness. The topcoat may be another electrocoat layer (i.e. re-electrodeposition) or electrostatically spray applied. In addition, other topcoat systems well known in the art may be applied (e.g. pigmented or unpigmented monocoat or base coat/clear coat).

The electroconductive pigment of the invention has the further advantage of allowing higher pigment to binder ratios in the electrocoat composition than is currently available using carbon blacks. This higher pigment to binder ratio results in enhanced edge coverage.

The electroconductive pigment of the invention is incorporated into the composition in the form of a paste. The pigment paste is prepared by grinding or dispersing the pigment into a grinding vehicle and optional ingredients such as wetting agents, surfactants, and defoamers. Pigment grinding vehicles are well known in the art. After grinding, the particle size of the pigment should be a Hegman grinding gauge of about 8 to 7. Overgrinding should be avoided since it will adversely effect bath stability, film appearance and conductivity of the cured film. Supplemental pigments could also be used in conjunction with the electroconductive pigment to impart color to the film and enhance corrosion protection. The supplemental pigments which can be employed in the practice of the invention include titanium dioxide, basic lead silicate, strontium chromate, carbon black, iron oxide, clay and so forth. Pigments with high surface areas and oil absorbencies (such as carbon blacks) should be used judiciously because they can have an undesirable effect on coalescence and flow.

The total electroconductive pigment-to-resin weight ratio is important. The minimum amount of electroconductive pigment needed to make the cured film conductive for re-electrocoating is preferably 0.1:1, more preferably 0.15:1 and most preferably 0.2:1 pigment to resin weight ratio. The maximum amount of electroconductive pigment that should be added for re-electrocoating purposes is preferably 0.5:1, more preferably 0.4:1 and most preferably 0.3:1 pigment to resin weight ratio. Amounts of electroconductive pigments greater than these result in poor film appearance and increased settling in the electrocoat tank.

Measurements of the conductivity of the cured electrocoat film was attempted by traditional methods such as using the Ransburg "sprayability meter" (model No. 236). The meter is calibrated in Ransburg Units (Ru) on a scale from 65 to 165. (A minimum reading of 125, which is equal to $3.2 \times 10^8$ ohms resistance is necessary for electrostatic spray application over a non-conductive substrate). However, it was discovered that with a conductive substrate (which is necessary for the initial electrocoat step) the Ransburg meter is not sensitive enough in the lower range to determine the minimum conductivity of the cured film required for re-electrocoating or electrostatic spraying. Although, as discussed above, it was found that there are minimum eletroconductive pigment to binder ratios (set out above) which are required for re-electrocoating over the initial cured electrocoat film. However, for electrostatic spraying over metal at currently used electrostatic application voltages, the conductivity of the cured electrocoat film may be relatively unimportant for typical film thicknesses (i.e. it may not be necessary for the cured film to be conductive). But for greater film thickness or reduced electrostatic spray voltages the conductivity of the cured electrocoat film may be important.

The electrically conductive pigment of the invention is a two-dimensional network of crystallites of antimony-containing tin oxide which exists in a unique association with amorphous silica or a silica-containing material. The antimony-containing tin oxide forms a two-dimensional network of densely packed crystallites on the surface of the silica or silica-containing material. The silica or silica-containing material is a substrate, and the network comprises a generally uniform layer of crystallites in which the crystallites form an electrically conducting pathway to adjacent crystallites. The layer of tin oxide crystallites is typically about 5 to 20 nm in thickness but covers the surface of a particle with major dimensions that are typically ten to ten thousand times as large as the thickness of the tin oxide layer. The crystallites are, thus, part of a continuous conducting layer in two dimensions.

The silica substrate can be practically any shape. In the form of flakes or hollow shells, satisfactory results may be achieved when the two-dimensional network is formed on only one side of the silica substrate. In general, however, best results are obtained when practically all of the exposed surface of the silica substrate is coated with the crystallite layer.

The silica containing material of the silica substrate can be a metal silicate, silica containing glass or a material having an extensive co-valent network of SiO₄ units.

The pigment is a powder comprising shaped particles of amorphous silica which are coated with a two-dimensional network of antimony-containing tin oxide [$SnO_2(Sb)$] crystallites. The finished particles, typically, are tens of microns to sub-micron in size, and they, in turn, are capable of forming an electroconductive network within the matrix of a thin paint film. The shaped particles of amorphous silica may be in the form of needles, platelets, spheres, dendritic structures or irregular particles. These provide an extended surface for the deposition of the antimony-containing tin oxide.

In one preferred pigment, the amorphous silica powder comprises thin shells or platelets less than about 20 nm in thickness. The pigment, when dispersed in a vehicle, is generally transparent, and its presence as a component of pigment in paint has little impact on color and related properties.

A process for preparing the electrically conductive pigment comprises:

(A) providing a substrate of amorphous hydroxylated silica or active silica-containing material, (B) applying a coating layer to the substrate surface consisting essentially of hydrous oxides of antimony and tin, and (C) calcining the coated substrate at a temperature in the range of 400° to 900° C. in an oxygen-containing atmosphere.

The coating layer of hydrous oxides of antimony and tin is applied to the hydroxylated substrate surface by adding aqueous solutions of hydrolyzable Sn and Sb salts to a slurry containing the silica at a pH in the range of about 1.5 to about 3.5, preferably at a pH of 2.0. Calcining the coated silica substrate perfects the crystalline phase of the $SnO_2(Sb)$ coating layer which imparts the desired electroconductive properties to the individual particles of the composition.

According to one aspect of the process for making the pigment, the substrate of amorphous hydroxylated silica or active silica-containing material is prepared by coating a finely divided solid core material with active silica and then removing the core material without unduly disturbing the silica coating. The substrate thus produced comprises hollow silica particles which are substantially translucent and which have the general shape of the core material. The silica coating should be sufficiently thin, for this purpose, so as not to reflect light. This will normally mean a thickness of less than about 250 nm. For most applications, thicknesses in the range of about 5 to 20 nm are preferred.

Active silica is conveniently prepared by gradually neutralizing an aqueous solution of sodium silicate or potassium silicate with a mineral acid, such as, for example, sulfuric acid or hydrochloric acid.

Active silica-containing materials may conveniently be applied as coatings for a selected core material by including other components along with the active silica in the reacting solution. For example, by adding sodium borate along with the sodium or potassium silicate, a silica-boria coating may be obtained. Such coatings are effective as a substrate so long as the surface of the coating contains hydroxylated silica functionalities. If the other component or components present in the silica-containing substrate inhibit the retention of hydroxyl groups on the substrate surface, then the subsequent $SnO_2(Sb)$ coating may not adhere completely and may, thus be less effective.

The electroconductive pigment may also be in a form where the core material remains encapsulated with the shell of amorphous silica or silica-containing material, i.e., it is not removed. Examples of suitable core materials for this embodiment include $TiO_2$, mica, Kaloin, talc, and $BaSo_4$. In either case, the silica coating is coherent and is bound upon the core material forming a coating layer which is substantially uniform in thickness from about 5 to 20 nm. The preferred core materials are $TiO_2$ and mica.

The electroconductive pigments of this invention are described in more detail in co-pending application Ser. No. 07/386,765 filed Aug. 2, 1989 which is incorporated herein by reference.

The coating compositions of the invention can contain optional ingredients such as wetting agents, surfactants, defoamers and so forth. Examples of surfactants and wetting agents include alkyl imidazolines such as those available from Ciba-Geigy Industrial Chemicals as "Amine C", acetylenic alcohols available from Air Products and Chemicals as "Surfynol 104". These optional ingredients, when present, constitute from about 0 to 20 percent by weight of resin solids. Plasticizers are optional ingredients because they promote flow. Examples are high boiling water immersible materials such as ethylene or propylene oxide adducts of nonyl phenols or bisphenol A. Plasticers are usually used at levels of about 0 to 15 percent by weight resin solids.

The electrodepositable coating compositions of the present invention are dispersed in aqueous medium. The term "dispersion" as used within the context of the present invention is believed to be a two-phase translucent or opaque aqueous resinous system in which the resin is in the dispersed phase and water the continuous phase. The average particle size diameter of the resinous phase is about 0.1 to 10 microns, preferably less than 5 microns. The concentration of the resinous products in the aqueous medium is, in general, not critical, but ordinarily the major portion of the aqueous dispersion is water. The aqueous dispersion usually contains from about 3 to 50 percent preferably 5 to 40 percent by weight resin solids. Aqueous resin concentrates which are to be further diluted with water, generally range from 10 to 30 percent by total weight solids.

Besides water, the aqueous medium may also contain a coalescing solvent. Useful coalescing solvents include hydrocarbons, alcohols, esters, ethers and ketones. The preferred coalescing solvents include alcohols, polyols and ketones. Specific coalescing solvents include monobutyl and monohexyl ethers of ethylene glycol, and phenyl ether of propylene glycol. The amount of coalescing solvent is not unduly critical and is generally between about 0 to 15 percent by weight, preferably about 0.5 to 5 percent by weight based on total weight of the resin solids.

EXAMPLES

Example A

Preparation of Backbone Resin

A primary hydroxy containing resin was prepared according to U.S. Pat. No. 4,397,990 Column 10, Example 1 (b) as described immediately below.

To a solution of epoxy resin Epon ® 1001 (289.2 gms; 0.6 epoxy equivalent) in ethylene glycol monobutyl ether (161 gms.) were added diethanol amine (21.0 gms; 0.2 mole), 3-(N,N-Dimethyl amino) propylamine (10.2 gms; 0.1 mole) and an adduct of 1,6-diamino hexane and Cardura E-10® (61.6 gms; 0.1 mole of adduct). (Cardura E-10® is a glycidyl ester of $C_{10}$ acid available from Shell Chemical Co.). This adduct had been prepared by reacting 1,6 diamino hexane (116 gms; 1 mole) with Cardura E-10® (500 gms; 2 moles) at 80° C. for 3 hours. The mixture of the epoxy resin Epon® 1001 and the amines was reacted by heating first at 85° C.–90° C. for 4 hours with stirring, and then at 120° C. for 1 hour. The epoxy content was then zero. The theoritical amine milliequivalent per gm solid was 1.57; theoritical hydroxy content of 0.47 equivalent/100 gms and theoritical solids of 70.3%.

Example B

Preparation of Conductive $TiO_2$ Millbase

A millbase was prepared as follows:

|  | Parts By Weight |
|---|---|
| Backbone resin (from Ex. A) | 16.03 |
| 85% Lactic Acid | 1.81 |
| Deionized Water | 44.66 |
| Conductive Pigment* | 37.50 |
| Total | 100.00 |

*Pigment particles with a $TiO_2$ core coated with silica, the silica is in association with a two-dimensional network of antimony-containing tin oxide crystallites. This conductive pigment is prepared as generally described in Example 6 of copending application Ser. No. 07/386,765 filed August 2, 1989 and below in Example G.

The Lactic Acid was added to the above resin and mixed thoroughly, for about five minutes. Deionized water was then added slowly with mixing to emulsify the neutralized resin. The conductive pigment was then added slowly with a stirring to produce a slurry with a premix viscosity of 59 Krebs Units when measured on a Brookfield viscometer. This slurry was then ground in a sand mill until a Hegman grinding gauge of 8 to 7 was obtained. This produced a millbase with 50.0% solids, (37.50% pigment, 12.50 resin non-volatiles) and a 3/1 pigment to binder ratio.

Example C

Preparation of the Crosslinker

A toluene diisocyanate type crosslinker is prepared as described immediately below:

|  | Moles | M.W. | Weight |
|---|---|---|---|
| 80% aqueous phosphoric acid | — | — | 0.005 |
| 80,20 toluene diisocyanate | 3 | 174 | 34.169 |
| Butoxyethoxy ethanol | 3 | 162 | 31.953 |
| Dibutyl Tin DiLaurate | — | — | 0.010 |
| Trimethylol Propane | 1 | 134 | 8.868 |
| Butanol | — | — | 0.500 |
| Methylisobutyl Ketone | — | — | 24.495 |
| Total |  |  | 100.000 |

The phosphoric acid and 80,20 toluene diisocyanate were charged to a reaction flask, which was fitted with a stirrer, condenser and had capability for heating and/or cooling, and mixing. The butoxyethoxy ethanol was added slowly over a three hour period, with stirring while holding the exotherm temperature to a maximum of 70° C. Once the feed was completed, it was held at 65°–70° C. and sampled every 30 minutes until the percent isocyanate was 11.9 to 12.9.

Once this specification was achieved, dibutyl tin dilaurate was added and mixed in. Then trimethyl propane was added slowly over a three hour period. The batch temperature was allowed to rise to 120° C. at the end of this feed. The temperature was held at 120° C. until the percent of free isocyanate was zero. Once this was achieved, butanol was slowly added, followed by methyl isobutyl ketone. The reaction mass was cooled to 70° C. and filtered while holding the temperature around 70° C. The final composition was 74–76% solids, had zero percent free isocyanate and had a 40–60 second viscosity @25° C.

Example D

Preparation of Dibutyl Tin Oxide Paste

A dibutyl tin oxide paste was prepared as immediately below:

|  | Parts By Weight |
|---|---|
| Backbone resin (from Ex. A) | 14.22 |
| 85% Lactic Acid | 1.58 |
| Deionized water | 54.20 |
| Dibutyl tin oxide (DBTO) powder | 30.00 |
| Total | 100.00 |

Lactic acid was added to the backbone resin while mixing; then the deionized water was added slowly while mixing to emulsify. Dibutyl tin oxide was then added slowly while stirring to produce a slurry. This slurry was then processed in a stainless steel attritor for 13 hours.

This gave a 40% solids paste, comprised of 30% DBTO and 10% resin solids for a 3/1 pigment to binder ratio.

Example E

Preparation of Conductive Mica Millbase

A millbase was prepared as follows:

|  | Parts By Weight |
|---|---|
| Backbone resin (from Ex. A) | 16.03 |
| 85% Lactic Acid | 1.81 |
| Deionized Water | 44.66 |
| Conductive Pigment** | 37.50 |
| Total | 100.00 |

**Pigment particles with a mica core, coated with silica, the silica is in association with a two-dimensional network of antimony-containing tin oxide crystallites. This conductive pigment is prepared as generally described in Example 12 of copending application Ser. No. 07/386,765 filed August 2, 1989 and below in Example H.

The lactic acid was added to the above resin and mixed thoroughly, for about five minutes. Deionized water was then added slowly with mixing to emulsify the neutralized resin. The conductive pigment was then added slowly with stirring to produce a slurry with a premix viscosity of 75 Krebs Units when measured on a Brookfield viscometer. This slurry was then ground in a sand mill until a Hegman grinding gauge of 8 to 7 was obtained. This produced a millbase with 50.0% solids, (37.50% pigment, 12.50 resin non-volatiles) and a 3/1 pigment to binder ratio.

Example F (A) In an 18-liter, agitated polyethylene beaker, 3 liters of water were brought to a pH of 10.0 with sodium hydroxide. A stock solution of sodium silicate was prepared and filtered to remove insoluble material. The stock solution has a $SiO_2/Na_2O$ molar ratio of 3.25/1, and contained 398 g of $SiO_2$ per liter of solution. 65 ml of this solution were added to the 18-liter beaker. Thereafter, 1350 g of $BaCO_3$, which had been predispersed in one liter of water, was added to form a slurry. The slurry was heated to 90° C. in one-half hour by the introduction of steam, after which the pH was 9.7. Next, a sodium silicate solution and a sulfuric acid solution were simultaneously added over a period of 3 hours, while stirring the slurry vigorously and while maintaining the pH at 9.0. The sodium silicate solution was prepared by diluting 342 ml of the above sodium silicate stock solution to 600 ml with water. The sulfuric acid solution was prepared by diluting 69 g of 96% $H_2SO_4$ to 600 ml with water. All of the sodium silicate solution was added to the slurry. Sufficient sulfuric acid was added to maintain the pH at 9.0. After the simultaneous addition was complete, the slurry was then digested at 90° C. for one-half hour, and the resulting silica-coated $BaCO_3$ particles were isolated by filtration, washed with water to remove soluble salts, and dried overnight at a temperature of 120° C. 1485 g of dry powder were recovered.

(B) In a 3-liter, agitated glass flask, 250 g of the powder prepared in (A) above were dispersed in 1 liter of water, and the resulting slurry was heated to a temperature of 90° C. 164 ml. of nominal 37% HCl was then added slowly to the slurry which lowered the pH to a value of 2.0 and dissolved the $BaCO_3$ material. Next, a $SnCl_4/SbCl_3/HCl$ stock solution was prepared by dissolving $SNCl_4.5H_2O$ in water and dissolving $SnCl_3$ in nominal 37% HCl. These were combined in a ratio to give the equivalent of 10 parts of $SnO_2$ to 1 part of Sb, and diluted with water to yield a solution containing the equivalent of 0.215 g $SnO_2$/ml and 0.0215 g Sb/ml. 256 ml of this Sn/Sb/HCl solution was then added to the slurry over a period of 2 hours simultaneously with sufficient 10% NaOH to maintain the pH of the slurry at 2.0. The slurry was digested for a half-hour at pH=2.0 and at a temperature of 90° C., and then the resulting particles were fitlered, washed to remove soluble salts, and dried overnight at a temperature of 120° C. The dried particles, which comprised a powder, were then calcined in air at 750° for 2 hours. 106 g of dry powder were recovered. The finished powder product had a dry powder resistivity of 5 ohms. By X-ray fluorescence analysis, the powder was found to contain 46% Sn (as $SnO_2$), 22% Si (as $SiO_2$), 18% Ba (as BaO), and 4% Sb (as $Sb_2O_3$). This powder, when examined under the electron microscope, was found to consist of hollow shells of silica with fine crystallites of antimony-doped tin oxide forming a uniform, two-dimensional network on the surface of the silica. The powder was formulated with a test paint carrier at a pigment/binder loading of 25/100 and applied to a test surface. The resulting dry paint film exhibited a surface conductivity of 140 Ransburg units.

Example G

Preparation of Conductive Pigment ($TiO_2$ Core)

(A) In an agitated, 18-liter polyethylene beaker, 3000 g. of 97% pure rutile titania powder, with a 6.8 $m^2$/g surface area, were dispersed in 6 liters of water. The pH was brought to 10.0 with NaOH. 454 ml of the sodium silicate stock solution of Example F (which corresponds to Example 1 of copending application Ser. No. 07/386,765 filed Aug. 2, 1989) were added to the agitated slurry. The slurry was heated to 90° C. in one-half hour by the direct introduction of steam. Then, 10% sulfuric acid was added gradually over a period of 2 hours, until a pH of 7 was reached. The slurry was then held at 90° C. and a pH of 7 for an additional one-half hour, and the resulting silica-coated titania particles were isolated by filtration, washed to remove soluble salts, and dried overnight at a temperature of 120° C. 3108 g of powder were recovered.

(B) 100 g of the powder prepared in (A) above was dispersed in one liter of water, using a high speed mixer. The slurry was transferred to an agitated, 3-liter glass flask and 200 g of barium carbonate powder were added. The slurry was then heated to 90° C. and the pH was adjusted to 2.0 by the addition of hydrochloric acid. Then, 197 ml. of a $SnCl_4/SbCl_3/HCl$ solution were added to the slurry over a period of 2 hours, while maintaining the pH at 2.0 by the simultaneous addition of a 10% NaOH solution. The $SnCl_4/SbCl_3/HCl$ solution contained the equivalent of 0.254 g $SnO_2$/ml, 0.0262 g Sb/ml and was prepared as in Example F (corresponding to Example I of copending application Ser. No. 07/386,765 filed Aug. 2, 1989). The slurry was held an additional one half-hour at 90° C. and pH 2.0, after completion of the simultaneous additions. The resulting particles were filtered, washed to remove soluble salts, and dried overnight at a temperature of 120 C. The powder was then calcined in air at 600° C. for 2 hours. 155 g of powder were recovered. The dry powder resistivity was 3 ohms. By X-ray fluorescence analysis, the powder contained 32% Sn (as $SnO_2$), 4% Si (as $SiO_2$), 4% Sb (as $Sb_{203}$), and 60% Ti (as $TiO_2$). Examination of the powder under the electron microscope revealed that the titania particles were coated with silica, and that the silica surface was coated with fine crystallites of tin oxide. The crystallites of antimony-containing tin oxide were uniformly dispersed as a two-dimensional network on the silica surfaces. The isoelectric point of this powder was determined to be 3.1. The surface area, by nitrogen adsorption, was 15.4 $m^2$/g and the average pore diameter was 9 nm. By X-ray diffraction line broadening, the tin oxide crystallite size was determined to be 15 nm. By transmission electron microscope, the average antimony-doped tin oxide crystallite size was determined to be 9 nm. The finished product had a dry powder resistance of 3.2 ohms.

Example H

Preparation of Conductive Pigment (Mica Core)

(A) 188 g. of wet-ground Muscovite mica, with a surface area of 8.7 $m^2$/g, was dispersed with 0.8% of triethanolamine in 2000 ml. of distilled water. The process temperature was raised to 90° C. and held there for the remainder of the aqueous processing. The pH was adjusted to 10.0 with 20% NaOH, and 50 g of 3.29 ratio potassium silicate (25% $SiO_2$) was added to the stirred slurry over two minutes. 20% HCl was then added to the slurry over a 2 hour period, bringing the pH to 8.0. The pH was then further adjusted to 7.0 with 20% HCl, and the slurry was stirred for 30 minutes. The pH was then adjusted to 2.0 with 20% HCl, and 220 g. of $CaCl_2$ were added to the bath over a five minute period. 220 ml of a $SnCl_4$ solution (0.445 g $SnO_2$/ml) and 42 ml. of a $SbCl_3$ solution (0.235 g Sb/ml) were mixed together and added to the slurry over 2 hours, maintaining the pH at 2.0 by the addition of 20% NaOH. The slurry was held at 90° C. and a pH of 2 for 30 minutes. It was then filtered, washed free of soluble salts and dried at 120° C. for 12 hours. The dried product was calcined at 75° C. for 2 hours. By X-ray fluorescence analysis, the powder was found to contain 33.1% Sn (as $SnO_2$), 4.0% Sb (as $Sb_2O_3$, 31.2% Si (as $SiO_2$), 22.0% Al (as $Al_2O_3$), 31.2%

Si (as $SiO_2$), 22.0% Al (as $Al_2O_3$), and 6.3% K (as $K_2O$). By X-ray diffraction line broadening, the average $SnO_2$ crystallite size was 7 nm.

Example I

Preparation of Electrocoat Paint Bath

A cathodic electrodeposition paint, bath was prepared as immediately below:

|  | Parts By Weight |
| --- | --- |
| Backbone resin (from Ex. A) | 8.21 |
| 85% Lactic Acid | 0.68 |
| Crosslinker (from Ex. C) | 6.22 |
| Conductive millbase (from Ex. B) | 17.78 |
| Dibutyl tin oxide paste (from Ex. D) | 0.44 |
| De-ionized water | 66.67 |
| Total | 100.00 |

The lactic acid was mixed with the backbone resin. To this mixture the conductive $TiO_2$ millbase, DBTO paste and de-ionized water were added in order with mixing. This produced an 80% neutralized paint bath with 20% solids and a 50/100 pigment to binder ratio. This bath was stirred in an open vessel for about 24 hours to allow for solvent evaporation prior to electrocoating. The Bath pH was 5.3, with a conductivity of 1900 micro mho's/cm.

This bath was heated to 85° F. and zinc phosphated cold rolled steel panels were cathodically electrocoated using 225 volts DC for 2 minutes. After rinsing, these panels were cured for 30 minutes in a 325° F. oven, giving a cured film build of 0.8 to 1.1 mils thickness. These films had a conductivity of about 160 Ransburg units when measured on the Ransburg Sprayability Meter, Model #236.

Example II

Re-electrodeposition of Panels From Example I

Some of the zinc phosphated cold rolled steel panels that had been coated, rinsed and baked in Example I, with film builds of 0.8 to 1.1 mils were immersed in the same conductive paint bath from Example I and cathodically re-electrocoated using 225 volts DC for 2 minutes. After rinsing, these panels were cured for 30 minutes in a 325° F. oven, giving a total cured film build of 1.6 to 2.2 mil. These re-electrocoated films had a conductivity, after cured, of about 150 Ransburg Units when measured on the Ransburg Sprayability meter, Model #236.

The panels electrocoated in Example I and panels re-electrocoated in Example II were sheared to expose a cross-section of the cold rolled steel substrate and the electrodeposited paint film, covering the face, edge and back of the steel substrate. This cross-section was then magnified 90×, photographed, and the desposited film's thickness measured at various points, most specifically on the sharp edges formed at the face-edge and the back-edge junctures. These results were then compared with panels which had been electrocoated with a conventional commercial available one-coat cathodic electrocoat formulation of the type generally described in U.S. Pat. Nos. 4,397,990 and 4,419,467. These photographs showed a visible and measurable increase in film coverage on the panel edges from Examples I and II when compared to the conventional one-coat cathodic electrocoat formulation not containing the electro-conductive pigment.

The conventional commercially available electrocoat paint films measured 0.148 mil. to 0.394 mil. in thickness on the sharp edges whereas the one coat conductive film measured 0.197 mil. to 0.738 mil. and the 2-coat or re-electrocoated conductive film measured 0.641 mil. to 1.130 mil, in thickness on the sharp edges.

Example III

Re-electrodeposition of Panels From Example I

Some of the panels from Example I were re-electrodeposited using the conventional, commercially available cathodic paint bath discussed above and disclosed in U.S. Pat. Nos. 4,397,990 and 4,419,467.

Zinc phosphated cold rolled steel panels that had been coated, rinsed and baked in Example I with a cured film build of 0.8 mils to 1.1 mils were immersed in a conventional, commercially available cathodic electrodeposition bath (as described above), and re-electrocoated using 250 volts DC for 2 minutes. After rinsing, these panels were baked for 30 minutes in a 325° F. oven, giving a total film build of 2.0 mil. to 2.3 mil.

Example IV

Preparation of Electrocoat Paint Bath

|  | Parts By Weight |
| --- | --- |
| Backbone resin (from Ex. A) | 10.78 |
| 85% Lactic Acid | 0.94 |
| Crosslinker (from Ex. C) | 7.18 |
| Conductive pigment millbase (from Ex. E) | 12.31 |
| Dibutyl tin oxide paste (from Ex. D) | 0.51 |
| Deionized water | 68.28 |
| Total | 100.00 |

The lactic acid was mixed with the backbone resin. To this, the conductive pigment millbase, DBTO paste and de-ionized water were added in order with mixing., This produced an 80% neutralized paint bath with 20% solids and a 30/100 pigment to binder ratio. This bath was stirred about 24 hours in an open vessel for solvent evaporation prior to electrocoating. Bath pH was 5.6 with a conductivity of 2050 micro mho's/cm. This bath was heated to 85° F. and zinc phosphated cold rolled steel panels were cathodically electrocoated using 175 volts D.C. for 2 minutes. The panels were then baked for 30 minutes in a 325° F. oven, giving a cured film build of 0.8 to 1.1 mils thickness. These films had a conductivity of 150 Ransburg Units when measured with the Ransburg Sprayability Meter, Model #236.

I claim:

1. In an improved method of cathodic electrocoating comprising the following steps:
    a) cathodically electrocoating a first cathodic electrocoat composition having a film forming polymer binder of a crosslinkable resin and a crosslinker on a metal substrate;
    b) baking the cathodically electrocoated metal substrate to cure the film forming polymer; and
    c) re-electrocoating a second cathodic electrocoat composition over the substrate with the cured film;
    wherein the improvement comprises the first cathodic electrocoat composition that contains an electroconductive pigment in a pigment to binder weight ratio of about 0.1:1 to 0.5:1 in which the electroconductive pigment is a powder comprising shaped particles selected from the group consisting of amorphous silica, silica containing material or particles comprising an inert core material having an amorphous silica coating or a silica containing coating; said shaped particles being surface-coated with a two-dimensional conducting network of antimony-containing tin oxide crystallites in which the antimony content ranges from about 1–30% by weight of the tin oxide crystallites.

2. The method of claim 1 wherein the shaped particles are hollow shells of amorphous silica or a silica-containing material.

3. The method of claim 1 wherein the silica-containing material is a composition selected from the group consisting of metal silicates, silica-containing glass, and material having an extensive co-valent network involving $SiO_4$ units.

4. The method of claim 3 in which the silica-containing material is a silica-boria material.

5. The method of claim 2 in which the inert core material is $TiO_2$ or mica.

6. The method of claim 1 in which the crosslinkable resin is an epoxy-amine adduct.

7. The method of claim 1 in which the crosslinker is a blocked polyisocyanate.

* * * * *